March 9, 1926.
A. W. NORDGREN
BUMPER AND MOUNTING MEANS
Filed Nov. 4, 1925
1,576,483
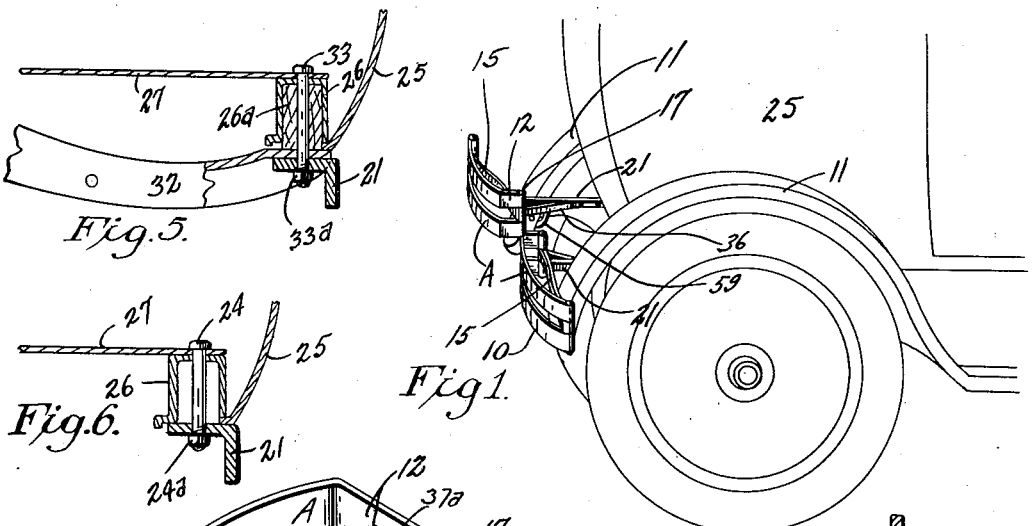
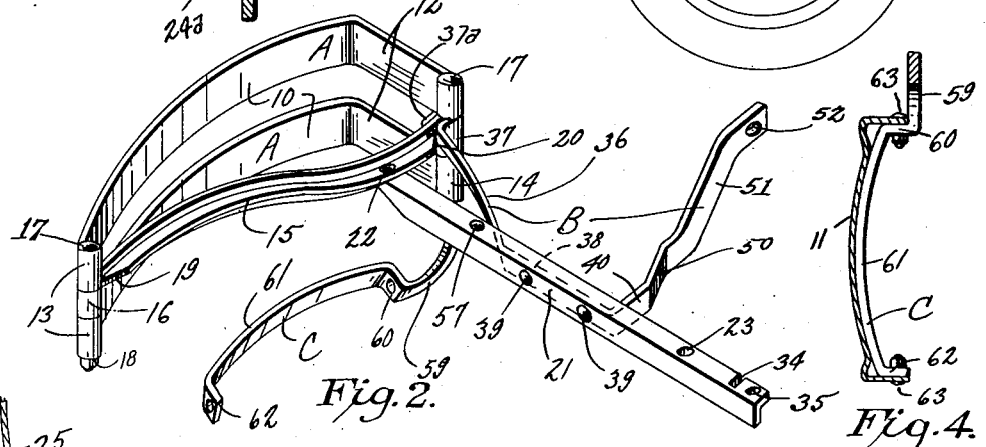
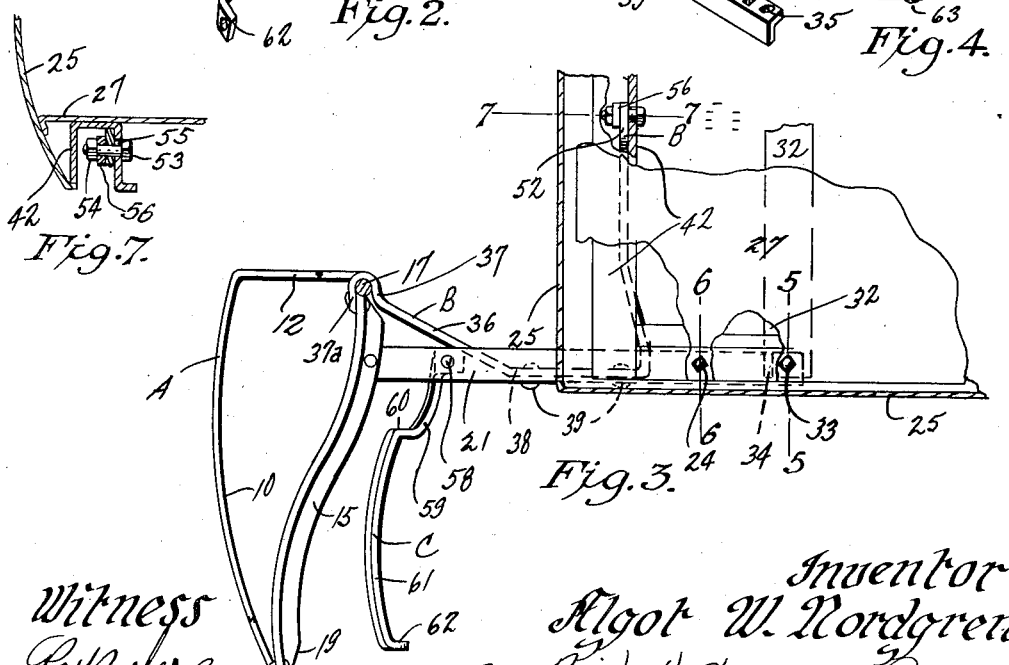
Witness
Ray Rusher
Inventor
Algot W. Nordgren
by Bair & Freeman Attorneys Patented Mar. 9, 1926.

1,576,483

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

BUMPER AND MOUNTING MEANS.

Application filed November 4, 1925. Serial No. 66,709.

*To all whom it may concern:*

Be it known that I, ALGOT W. NORDGREN, a citizen of the United States, and a resident of St. Paul, in the county of Ramsey and State of Minnesota, have invented a certain new and useful Bumper and Mounting Means, of which the following is a specification.

The object of my invention is to provide a bumper and mounting means of simple, durable and inexpensive construction.

More particularly, it is my object to provide a bumper structure which can be made in two distinct units, to-wit, a right and a left-hand unit on the rear of a car, where it is desirable to leave ample space between the bumper units for a spare tire and its carrier, and to provide in connection with such a bumper structure a novel and simple means whereby the bumper structure may be rigidly attached to the car in such manner as to properly resist all strains to which it is likely to be subjected, which means of attachment is peculiarly adapted for mounting the bumper on cars of certain types.

With these and other objects in view, my invention consists in the construction, arrangement and combination of the various parts of my bumper and mounting means, whereby the objects contemplated are attained, as hereinafter more fully set forth, pointed out in my claims, and illustrated in the accompanying drawings, in which:

Figure 1 is a perspective view of a part of a motor vehicle equipped with a bumper and mounting means embodying my invention.

Figure 2 is a perspective view of one of the bumper and attaching units fully assembled ready for installation on a car.

Figure 3 is a top or plan view of one of the units, comprising a bumper and attaching means assembled on a car, parts of the car being shown in section and parts being broken away.

Figure 4 is a horizontal, sectional view illustrating the fender brace portion of my device and the fender to which it is attached.

Figure 5 is a detail, sectional view taken on the line 5—5 of Figure 3.

Figure 6 is a similar view taken on the line 6—6 of Figure 3; and

Figure 7 is a detail, sectional view taken on the line 7—7 of Figure 3.

In the accompanying drawings, I have shown a portion of an automobile having the body 25 and the fenders 11. The body also has the longitudinal downwardly opening channel-shaped frame members 26, the transverse channel frame member 32 and the transverse frame member 42, having the form of a downwardly opening channel and located under the body just at the rear end thereof.

For convenience, I will describe my device in its position and arrangement when installed on the rear of a car.

The bumpers and attaching means are made in right and left units, and I shall describe only the right-hand unit, it being understood that the left-hand unit is the same as the right-hand unit with the necessary changes for applying it to the left-hand side of the machine.

It will be understood that my device may be attached to the front of the motor vehicle as well as the rear, and that when I use the terms "rearwardly", "forwardly" and so forth, I use them because they are convenient in describing the device as attached to the rear of the car and not with any intention to limit myself to a rear bumper structure.

I have provided a bumper comprising resilient bumper elements indicated generally by the reference character A and a rigid member 15 extended between and connecting the ends of the bumper elements A.

Each bumper element A comprises a curved portion indicated by the numeral 10, which when assembled as a rear bumper stands just rearwardly of the rear end of the rear fender and projects laterally a little beyond each side of the fender, so as to afford maximum protection for the rear end of the fender.

At the inner ends of the portions 10 of the bumper elements A, they are curved forwardly to form portions 12. The free ends of the portions 12 and 12 terminate in eyes 13 and 14 respectively.

The eyes 13 of the respective members 10 are arranged in alignment with each other and likewise the eyes 14 are arranged in vertical alignment.

A bolt 17 is mounted in the eyes 13 and has on its lower end a nut 18. A similar bolt 17 is mounted in the eyes 14.

The member 15 above referred to, which preferably has the form of a rigid T-iron formed with a reverse curve, as shown for instance in Figure 3, has at its outer end an eye 16 arranged between the eyes 13 in alignment therewith and receiving the outer bolt 17.

The inner end of the rigid T-iron 15 stands adjacent to the other bolt 17 and is secured thereto and thus to the portions 12 of the resilient bumper members A in the manner hereinafter described.

The horizontal flange of the member 15 is cut on a bevel at its ends, as indicated at 19 and 20 in Figure 3.

A bumper support 21 preferably having the form of an angle bar with an upper horizontal flange and a downwardly projecting flange is fastened to the rigid T connecting member 15, preferably at a point spaced outwardly from the inner end thereof and preferably by means of a bolt or rivet 22.

The support 21 extends forwardly substantially at right angles to the connecting member 15 with its forward end resting below the longitudinal body frame member 26 and is provided at its forward end with spaced holes 23 and 35.

The end of the transverse frame member 32 stands just below the longitudinal frame member 26.

The floor 27 of the body 25 is secured to the frame members 26 and 32 by means of a bolt 33, which extends through said floor and said frame members and through the wood filler block 26ª, and has on its lower end the nut 33ª.

The support 21 has near its free end the notch 34. When the support 21 is assembled on the car, the nut 33ª is removed and the support 21 is placed in position with the rear flange of the frame member 32 received in the notch 34 and the lower end of the bolt 33 received in the hole 35, after which the nut 33ª is replaced.

The end of the support 21 rests adjacent to the forward flange of the frame member 32.

Rearwardly of the bolt 33, a bolt 24 is extended through the floor 27, the longitudinal frame member 26 and the support 21, as shown in Figure 6, and is held in place by a nut 24ª.

The arrangement above described affords a fairly satisfactory rigid connection between the bumper structure and the car body, but in order to assure a maximum of rigidity and of resistance against strains, which may be imparted to the bumper from any direction, and in any manner, I have provided the brace B, which has a portion 36, having at one end an eye 37 receiving the inner bolt 17 and provided with an extension 37ª fixed to the member 15.

The member 36 is inclined from the bolt 17 on which it is mounted rearwardly and laterally to the support 21, and is integrally connected with a portion 38 of the brace B, shown in dotted lines in Figures 2 and 3.

The portion 38 is rigidly secured to the upright flange of the member 21 snugly adjacent to the under surface of the horizontal flange thereof by means of rivets 39 or the like.

At the forward end of the portion 38, the brace B is inclined laterally inwardly and then rearwardly for a short distance as at 40 and 50, thence upwardly as at 51, thence directly inwardly as at 52. The portion 52 thus rests within the channel 42 adjacent to the forward flange thereof, as shown in Figure 7.

The floor 27 rests on the channel 42, as shown in Figure 7.

The portion 52 is secured to the forward flange of the channel 42 by means of a bolt 53 and a nut 54.

It may be said in this connection that my improved bumper and attaching means is intended to be attached to Ford cars. There are several models of Ford cars, and the means for attaching a bumper structure must vary somewhat depending upon the variations in the structures of these cars.

The present Ford touring car has the floor 27 resting on the channel 42 as shown in my drawing herewith and the forward flange of the channel 42 has the hole 55, as shown. This hole is larger than necessary for the attaching bolt 53, and I therefore mount on the bolt 53 a rectangular plate 56, having one edge which bears against the under side of the top of the channel 42 and holds the bolt against the lower edge of the hole 55.

The bumper support 21 and the brace B together with the fender brace, which will now be described, form a unit which can be manufactured and assembled in the factory and shipped as a unit.

For making the device stronger and more rigid when it is installed, I provide a fender brace C, comprising a horizontal portion 57 secured to the horizontal flange of the support 21 by means of a bolt or the like 58, and having a portion 59 extending downwardly and laterally away from the member 21 on the side thereof opposite the brace B.

At the outer end of the portion 59 is a rearwardly extending portion 60 arranged to fit inside one of the flanges of the fender 11.

From the portion 60 a curved portion 61 extends laterally and terminates in a forwardly extending portion 62 adapted to fit on the inside of the other flange of the fender.

The portions 60 and 62 are secured to the fender flanges by means of bolts 63.

It will thus be seen that I have provided a bumper and mounting means of very simple and relatively inexpensive construction, which can be made, assembled, stored and shipped as a unit.

The unit occupies a minimum of space.

The unit adapts itself for installation on a car, utilizing the structure of the car to a maximum advantage.

It is my purpose to cover by the claims written herein any modifications of the structure shown, which may be reasonably included within their scope.

I claim as my invention:

1. In a device of the class described, the combination of a car having a longitudinal and a transverse frame member with a bumper support having a portion arranged parallel with and secured to said longitudinal member, and a brace secured to said bumper support and inclined laterally and upwardly therefrom and secured to said transverse member at a point substantially spaced from the longitudinal member.

2. In a device of the class described, the combination of a motor vehicle frame having a longitudinal frame member and a downwardly-opening channel-shaped frame member with a bumper support having a portion parallel with and bolted to said longitudinal frame member, and a brace secured to said bumper support and inclined therefrom laterally and upwardly, so that its inner end projects into said channel-shaped frame member adjacent to one side thereof, and a bolt for securing the inner end of said brace to a flange of said transverse member.

3. In a device of the class described, the combination of a motor vehicle frame having a longitudinal frame member and a downwardly opening channel-shaped frame member with a bumper support having a portion parallel with and bolted to said longitudinal frame member, and a brace secured to said bumper support and inclined therefrom laterally and upwardly, so that its inner end projects into said channel-shaped frame member adjacent to one side thereof, a bolt for securing the inner end of said brace to a flange of said transverse member, and a plate received on said bolt and bearing against the central member of said channel-shaped frame member.

4. In a device of the class described, the combination of a motor vehicle frame having a longitudinal frame member and a downwardly opening channel-shaped frame member with a bumper support having a portion parallel with and bolted to said longitudinal frame member, a brace secured to said bumper support and inclined therefrom laterally and upwardly, so that its inner end projects into said channel-shaped frame member adjacent to one side thereof, a bolt for securing the inner end of said brace to a flange of said transverse member, a plate received on said bolt and bearing against the central member of said channel-shaped frame member, and a bumper secured to the outer end of said bumper support by means of a bolt at a point between the ends of the bumper, said brace having a portion extending parallel to and connected with said bumper support and a portion inclined away from the bumper support and secured to one end of the bumper.

5. The combination of a motor vehicle having a frame with a bumper support having at one end diverging parts secured at spaced points to the frame, a bumper connected with said bumper support, and a brace member connected with said bumper support and inclined away therefrom and provided with an eyelet, said bumper having a corresponding eyelet, and a bolt extended through said eyelets for connecting the bumper and the brace.

6. In a device of the class described, the combination of an automobile body having a longitudinal and a transverse frame member with a bumper including a bumper support secured to the automobile body and arranged parallel with the longitudinal frame member and extending rearwardly therefrom, a brace secured to said bumper support and extending at an angle laterally therefrom and secured to said transverse frame member at a point spaced from the longitudinal member and spaced from the connection between the support and automobile body and a pair of similar spaced spring bumper elements connected to said bumper support by spaced connections whereby the bumper elements will be braced relative to the support.

7. In a device of the class described, the combination of an automobile body having a longitudinal and a transverse frame member with a bumper including a bumper support secured intermediate of its ends to the automobile body and arranged parallel with the longitudinal frame member and extending rearwardly therefrom, a brace secured to said bumper support and extending at an angle laterally therefrom and secured to said transverse frame member at a point spaced from the longitudinal member and spaced from the connection between the support and automobile body and a pair of similar spaced spring bumper elements connected to said bumper support by spaced connections whereby the bumper elements will be braced relative to the support.

8. In a device of the class described, the combination of a car having a longitudinal and transverse frame member with a bumper support having a horizontal flange and a vertical flange, said bumper support being secured to said frame and arranged parallel with said longitudinal member, and an inclined brace connecting said bumper support with the transverse frame member, said brace having its end portions arranged at right angles to each other, one end portion being secured to the vertical flange of the bumper support and covered by the horizontal flange of the bumper support, a bumper element arranged with its protecting surface at right angles to the bumper support and having its ends spaced on opposite sides of the rear end of said bumper support, and means for connecting the ends of the bumper element with the bumper support.

ALGOT W. NORDGREN.